(12) United States Patent
Li (10) Patent No.: US 11,934,603 B2
(45) Date of Patent: Mar. 19, 2024

(54) DISPLAY PANEL AND ELECTRONIC DEVICE

(71) Applicant: Wuhan China Star Optoelectronics Semiconductor Display Technology Co., Ltd., Hubei (CN)

(72) Inventor: Yuanhang Li, Hubei (CN)

(73) Assignee: Wuhan China Star Optoelectronics Semiconductor Display Technology Co., Ltd., Hubei (CN)

( * ) Notice: Subject to any disclaimer, the term of this patent is extended or adjusted under 35 U.S.C. 154(b) by 73 days.

(21) Appl. No.: 16/624,784

(22) PCT Filed: Sep. 30, 2019

(86) PCT No.: PCT/CN2019/109454
§ 371 (c)(1),
(2) Date: Oct. 4, 2021

(87) PCT Pub. No.: WO2020/252980
PCT Pub. Date: Dec. 24, 2020

(65) Prior Publication Data
US 2022/0019328 A1    Jan. 20, 2022

(30) Foreign Application Priority Data
Jun. 19, 2019   (CN) .......................... 201910529491.1

(51) Int. Cl.
*G06F 3/041* (2006.01)
(52) U.S. Cl.
CPC ........ *G06F 3/04164* (2019.05); *G06F 3/0412* (2013.01)

(58) Field of Classification Search
None
See application file for complete search history.

(56) References Cited

U.S. PATENT DOCUMENTS 11,216,110 B2 *   1/2022   Chen ..................... G06F 3/0443
2014/0071384 A1   3/2014   Ho et al.
2019/0377442 A1   12/2019  Feng

FOREIGN PATENT DOCUMENTS

| CN | 103472963 A | 12/2013 |
|----|-------------|---------|
| CN | 104461135 A | 3/2015  |
| CN | 105760032 A | 7/2016  |
| CN | 107422903 A | 12/2017 |

(Continued)

*Primary Examiner* — Brian M Butcher
(74) *Attorney, Agent, or Firm* — Geoffrey Lottenberg; Berger Singerman LLP (57) ABSTRACT

The present disclosure provides a display panel, including a light emitting layer and a touch structure, wherein the touch structure includes a plurality of touch areas, and each of the touch areas includes a plurality of touch units, which are arranged in a first direction in at least two rows and arranged in at least two columns along the second direction, and the plurality of touch units in each of the at least two columns are arranged along the first direction, wherein a plurality of first traces are disposed below the touch area, the touch units in a same row are electrically connected to the driving circuit through one of the plurality of first traces corresponding to the row, the touch units in a same column are electrically connected to the driving circuit through a second trace corresponding to the column.

16 Claims, 4 Drawing Sheets

(56) References Cited

FOREIGN PATENT DOCUMENTS

| CN | 108446057 | A | 8/2018 |
|----|-----------|---|--------|
| CN | 207704416 | U | 8/2018 |
| CN | 108829285 | A | 11/2018 |
| CN | 109375827 | A | 2/2019 |
| CN | 109491546 | A | 3/2019 |

\* cited by examiner

Prior Art

DISPLAY PANEL AND ELECTRONIC DEVICE

BACKGROUND OF INVENTION

Cross-Reference to Related Applications

This application is the National phase under 35 U.S.C. § 371 of International Application No. PCT/CN2019/109454, filed Sep. 30, 2019, which claims the benefit of and priority to Chinese Patent Application No. 201910529491.1, filed Jun. 19, 2019. The entire contents of these patent applications are hereby incorporated by reference herein.

FIELD OF INVENTION

The present disclosure relates to a field of electronic display, and in particular to a display panel and an electronic device.

DESCRIPTION OF PRIOR ART

There are generally three methods for implementing the touch function in smart devices, including: plug-in display panel, integration in a display panel (in-cell), and integration on a display panel (on-cell). Compared with the in-cell solution and the plug-in solution, the on-cell solution has a simple manufacturing process, low cost, and high transmittance, and has become the preferred solution for the smart devices at this stage.

Figure 1:
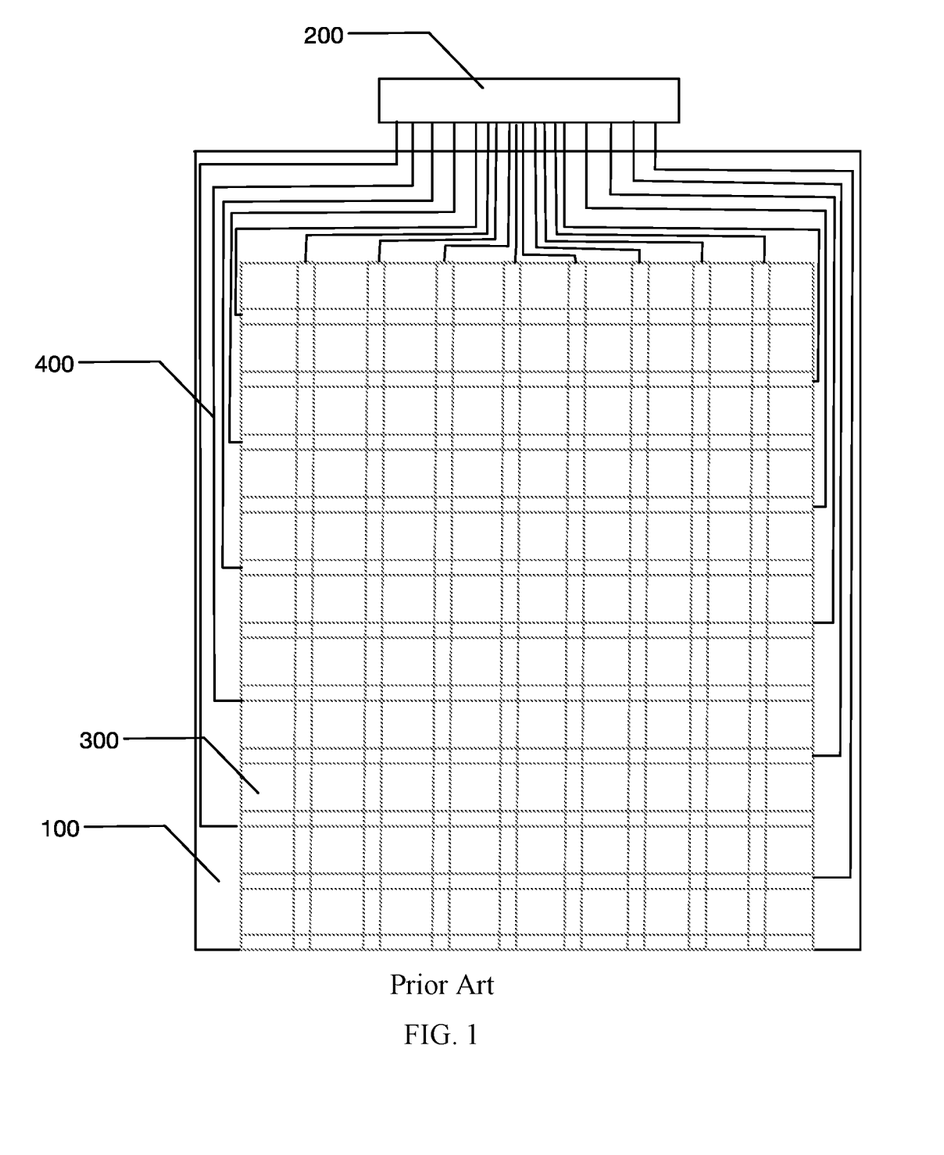
FIG. 1 is a schematic structural diagram of a touch structure of a display panel in the prior art.

Referring to FIG. 1, according to the on-cell solution in the prior art, a touch structure generally includes a plurality of touch electrodes, and each of the touch electrodes is electrically connected to a flexible circuit board through a metal lead disposed at a periphery of the touch electrode. These metal leads significantly increase an area ratio of a non-display area to a display panel, which is not conducive to increasing a screen-to-body ratio of the display panel.

SUMMARY OF INVENTION

The present disclosure provides a display panel and an electronic device, wherein a metal lead of the touch electrode is disposed under a touch area to reduce an area ratio of a non-display area to a display panel.

In order to solve the above problems, the present disclosure provides a display panel, the display panel includes a light emitting layer and a touch structure located above the light emitting layer, wherein
  the touch structure includes a plurality of touch areas and a driving circuit, and each of the touch areas includes a plurality of touch units;
  the plurality of touch units are arranged in a first direction in at least two rows, the plurality of touch units in each of the at least two rows are arranged in a second direction, the plurality of touch units are arranged in at least two columns along the second direction, and the plurality of touch units in each of the at least two columns are arranged along the first direction; and
  the driving circuit is located outside the touch areas, wherein
  a plurality of first traces are disposed below the touch area, the touch units in a same row are electrically connected to the driving circuit through one of the plurality of first traces corresponding to the row, and a plurality of first traces are disposed below the touch area;
  the touch units in a same column are electrically connected to the driving circuit through a second trace corresponding to the column.

According to one aspect of the present disclosure, the first direction and the second direction are perpendicular to each other, and the first traces are parallel to the first direction.

According to one aspect of the present disclosure, the touch units in each of the columns include a first end adjacent to the drive circuit and a second end distal from the drive circuit, and a plurality of second traces are led out from the first end.

According to one aspect of the present disclosure, each of the touch units includes:
  a first insulating layer having an opening;
  a first connecting line located in the opening of the first insulating layer;
  a first electrode located on the first connecting line, and is electrically connected to the first connecting line;
  a second electrode located on the first insulating layer, and is electrically insulated from the first electrode;
  a second insulating layer covering the first electrode, the second electrode, and the first insulating layer, wherein the second insulating layer has a via hole exposing the second electrode;
  a second connecting line located on the second insulating layer, and electrically connected to the second electrode through the via hole.

According to one aspect of the present disclosure, a plurality of first connecting lines of the plurality of touch units in each of the rows are electrically connected in sequence in the second direction to form a plurality of rows of connecting lines, each of the plurality of rows of connecting lines is electrically connected to one of the first traces correspondingly.

According to one aspect of the present disclosure, a plurality of second connecting lines of the plurality of touch units in each of the rows are electrically connected in sequence in the second direction to form a plurality of rows of connecting lines, and each of the plurality of rows of connecting lines is electrically connected to one of the second traces correspondingly.

According to one aspect of the present disclosure, the plurality of first traces are located in the first insulating layer and are electrically insulated from the first connecting lines, and the plurality of second traces are located in the second insulating layer and are electrically insulated from the second connecting line.

According to one aspect of the present disclosure, the first electrode in each of the touch units is in a strip shape, and a plurality of first electrodes of the plurality of touch units are disposed in parallel.

According to one aspect of the present disclosure, wherein the second electrode in each of the touch units is in a strip shape, a number of the second electrodes is two, and the two second electrodes are respectively located on opposite sides of the first electrode.

According to one aspect of the present disclosure, the first electrode and the second electrode of each of the touch units are disposed in parallel, the first electrode and the second electrode have an equal length, and each of the second electrodes is spaced apart from the first electrodes by an equal distance.

Correspondingly, the present disclosure further provides an electronic device, and the electronic device includes a display panel, wherein the display panel includes a light emitting layer and a touch structure located above the light emitting layer, wherein the touch structure includes a plurality of touch areas and a driving circuit, and each of the touch areas include a plurality of touch units; the plurality of touch units are arranged in a first direction in at least two rows, the plurality of touch units in each of the at least two rows are arranged in a second direction, the plurality of touch units are arranged in at least two columns along the second direction, and the plurality of touch units in each of the at least two columns are arranged along the first direction; and the driving circuit is located outside the touch areas, wherein a plurality of first traces are disposed below the touch area, the touch units in a same row are electrically connected to the driving circuit through one of the plurality of first traces corresponding to the row, and a plurality of first traces are disposed below the touch area; the touch units in a same column are electrically connected to the driving circuit through a second trace corresponding to the column.

According to one aspect of the present disclosure, the first direction and the second direction are perpendicular to each other, and the first traces are parallel to the first direction.

According to one aspect of the present disclosure, the touch units in each of the columns include a first end adjacent to the drive circuit and a second end distal from the drive circuit, and a plurality of second traces are led out from the first end.

According to one aspect of the present disclosure, each of the touch units includes: first insulating layer, having an opening; a first connecting line located in the opening of the first insulating layer; a first electrode located on the first connecting line, and is electrically connected to the first connecting line;

a second electrode located on the first insulating layer, and is electrically insulated from the first electrode; second insulating layer covering the first electrode, the second electrode, and the first insulating layer, wherein the second insulating layer has a via hole exposing the second electrode; a second connecting line located on the second insulating layer, and electrically connected to the second electrode through the via hole.

According to one aspect of the present disclosure, a plurality of first connecting lines of the plurality of touch units in each of the rows are electrically connected in sequence in the second direction to form a plurality of rows of connecting lines, each of the plurality of rows of connecting lines is electrically connected to one of the first traces correspondingly.

According to one aspect of the present disclosure, a plurality of second connecting lines of the plurality of touch units in each of the rows are electrically connected in sequence in the second direction to form a plurality of rows of connecting lines, each of the plurality of rows of connecting lines is electrically connected to one of the second traces correspondingly.

According to one aspect of the present disclosure, the plurality of first traces are located in the first insulating layer and are electrically insulated from the first connecting lines, and the plurality of second traces are located in the second insulating layer and are electrically insulated from the second connecting line.

According to one aspect of the present disclosure, the first electrode in each of the touch units is in a strip shape, and a plurality of first electrodes of the plurality of touch units are disposed in parallel.

According to one aspect of the present disclosure, the second electrode in each of the touch units is in a strip shape, a number of the second electrodes is two, and the two second electrodes are respectively located on opposite sides of the first electrode.

According to one aspect of the present disclosure, the first electrode and the second electrode of each of the touch units are disposed in parallel, the first electrode and the second electrode have an equal length, and each of the second electrodes is spaced apart from the first electrodes by an equal distance.

By modifying structures of touch units, the present disclosure sets metal traces connecting the touch units in a touch structure below a touch area. Compared with the prior art in which the metal traces are disposed outside the touch area, the present disclosure can prevent the metal traces of the touch area from occupying an area of a non-display area, thereby significantly reducing an area ratio of a non-display area to a display panel. Compared with the prior art, the present disclosure can effectively increase a screen-to-body ratio of the display panel.

DETAILED DESCRIPTION OF PREFERRED EMBODIMENTS

The following description of the various embodiments is provided to illustrate the specific embodiments of the invention. Directional terms mentioned in the present invention, such as "vertical", "horizontal", "upper", "bottom", "pre", "post", "left", "right", "inside", "outside", "side", etc., only refer to the direction of the additional drawing. Therefore, the directional terminology used is for the purpose of illustration and understanding of the invention. In the figures, structurally similar elements are denoted by the same reference numerals.

First, the prior art will be briefly described. Referring to FIG. 1, FIG. 1 is a schematic structural diagram of a touch structure of a display panel according to the prior art. The existing display panel includes a light emitting layer 100 and a touch structure located above the light emitting layer 100. The touch structure includes a plurality of touch units 300 and a driving circuit 200. The plurality of touch units are connected to the driving circuit 200 through traces 400. Referring to FIG. 1, in the prior art, in order to prevent the traces 400 from interfering with the touch units 300, the traces 400 are disposed on opposite sides of the touch area.

The area occupied by the traces 400 cannot normally display, that is, the traces 400 increase an area ratio of a non-display area to the display panel, which is disadvantageous for increasing a screen-to-body ratio of the display panel.

To solve the above problems, the present disclosure provides a display panel and an electronic device, wherein a metal lead of the touch electrode is disposed under a touch area to reduce an area ratio of a non-display area to a display panel. The present disclosure will be described in detail below with reference to the accompanying drawings.

Figure 2:
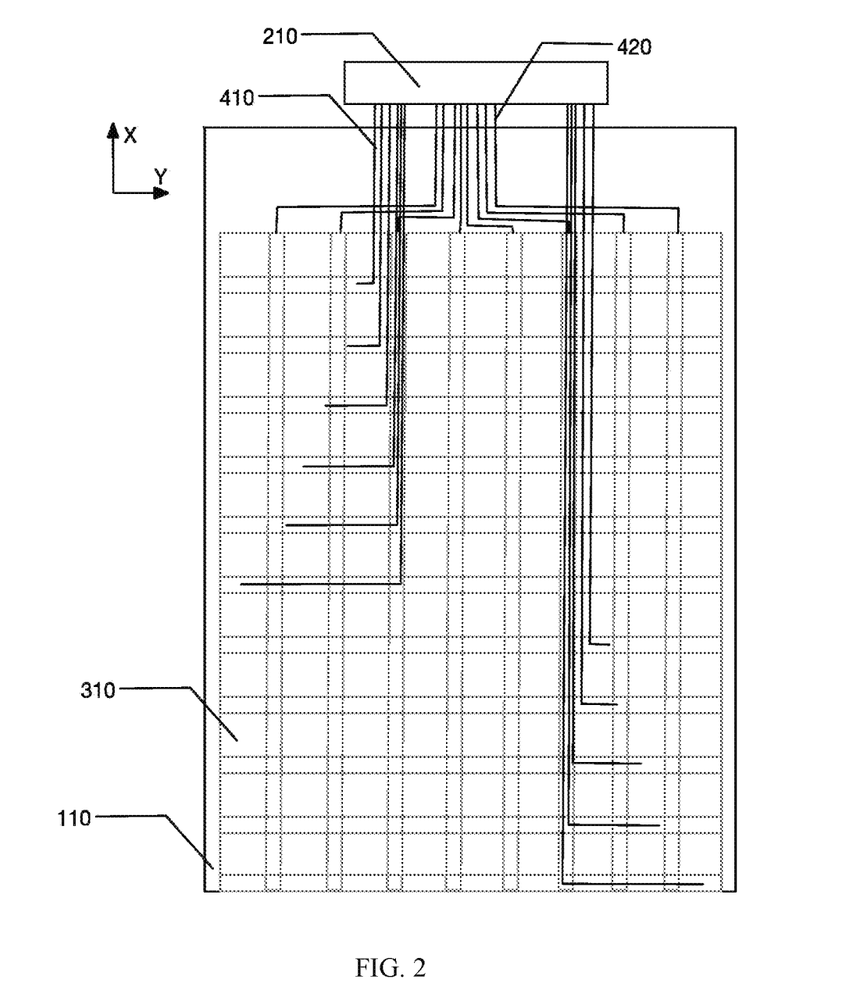
FIG. 2 is a schematic structural diagram of a touch structure of a display panel according to an embodiment of the present disclosure.

Referring to FIG. 2, the present disclosure provides a display panel including a light emitting layer 110 and a touch structure disposed above the light emitting layer 110.

The touch structure includes a plurality of touch areas and a driving circuit 210, and each of the touch areas includes a plurality of touch units 310. The plurality of touch units 310 have a same shape and size. In this embodiment, in order to ensure a sensing precision of the touch structure, each of the touch units 310 has an area less than or equal to 1 square millimeter.

Referring to FIG. 2, the plurality of touch units 310 are arranged in a first direction in at least two rows, the plurality of touch units 310 in each of the at least two rows are arranged in a second direction, the plurality of touch units 310 are arranged in at least two columns along the second direction, and the plurality of touch units 310 in each of the at least two columns are arranged along the first direction. The driving circuit 210 is located outside the touch areas.

In the present disclosure, the first direction and the second direction are perpendicular to each other, and the first traces are parallel to the first direction. In this embodiment, referring to FIG. 2, the first direction is an X direction, and the second direction is a Y direction. The touch units are arranged in rows along the X direction, and the plurality of touch units in each of the rows are arranged along the Y direction. The touch units are arranged in columns along the Y direction, and the plurality of touch units in each of the columns are arranged along the X direction.

Referring to FIG. 2, the touch units 310 in a same row is electrically connected to the driving circuit through a first trace 410 corresponding to the row, and the first trace 410 is located below the touch area. The touch units 310 located in a same column is electrically connected to the driving circuit through a second trace 420 corresponding to the column. In this embodiment, each column of touch units 310 includes a first end adjacent to the driving circuit and a second end distal from the driving circuit, and a plurality of second traces are led out from the first end. This arrangement can reduce distances of the traces, simplify the process, and save costs.

In order to achieve the above structure, the present invention optimizes and improves the structure of each of the touch units 310. Referring to FIG. 3 to FIG. 8, FIG. 3 to FIG. 7 are cross-sectional diagrams of touch units in a same row in different process steps according to an embodiment of the present disclosure, and FIG. 8 is a schematic structural diagram of a touch unit according to an embodiment of the present disclosure.

Referring to FIG. 8, each of the touch units 310 includes: a first insulating layer 13, a first connecting line 12, a first electrode 141, a second electrode 142, a second insulating layer 15, a second connecting line 16, and a third insulation layer 17. The structure and manufacturing method of the touch unit 310 will be described in detail below with reference to the accompanying drawings.

Figure 3:
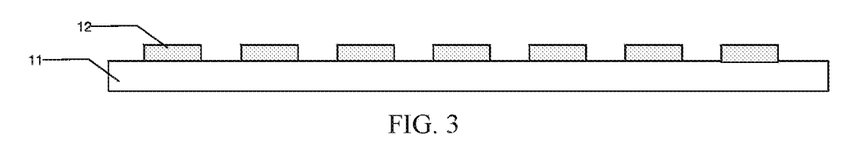
FIG. 3 is a cross-sectional diagram of touch units in a same row according to a specific embodiment of the present disclosure, showing a first connecting line of the plurality of touch units.
Figure 4:
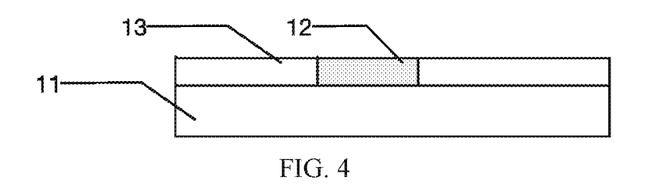
FIG. 4 is a partial enlarged diagram of FIG. 3, further illustrating a first insulating layer in a touch unit.

Referring to FIG. 3, first, a plurality of first connecting lines 12 are uniformly distributed and formed on the light-emitting layer 11. Each of the first connecting lines 12 corresponds to one of the touch structures 310. Thereafter, referring to FIG. 4, a first insulating layer 13 covering the first connecting line 12 is formed. The first insulating layer 13 has an opening, and the first connecting line 12 is located in the opening. Of course, in other embodiments, the first insulating layer 13 may be formed first, and then the first connecting line 12 is formed. The processes of forming the first insulating layer 13 and the first connecting line 12 are all performed by conventional techniques in the art, and are not described herein for brevity.

Figure 5:
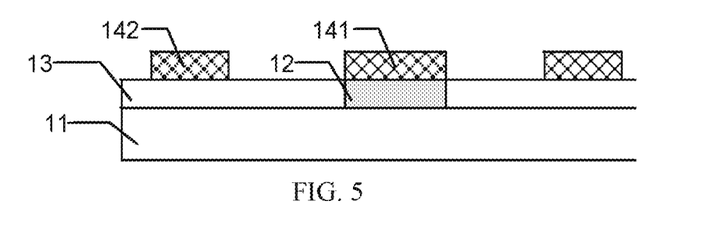
FIG. 5 is a cross-sectional diagram of the touch unit of FIG. 4, further illustrating a first electrode and a second electrode.

Thereafter, referring to FIG. 5, a first electrode 141 and a second electrode 142 are formed. The first electrode 141 is located on the first connecting line 12 and is electrically connected to the first connecting line 12. The second electrode 142 is located on the first insulating layer 13 and is electrically insulated from the first electrode 141.

Referring to FIG. 5, in this embodiment, the first electrode 141 in each of the touch units 310 is in a strip shape, and a plurality of first electrodes 141 of the plurality of touch units 310 are disposed in parallel. The second electrode 142 in each of the touch units 310 is in a strip shape, a number of the second electrodes 142 is two, and the two second electrodes 142 are respectively located on opposite sides of the first electrode 141. Preferably, the first electrode 141 and the second electrode 142 in each of the touch units 310 are disposed in parallel, and the first electrode 141 and the second electrode 142 are equal in length, and each of the second electrodes 142 is spaced apart from the first electrodes 141 by an equal distance.

Figure 6:
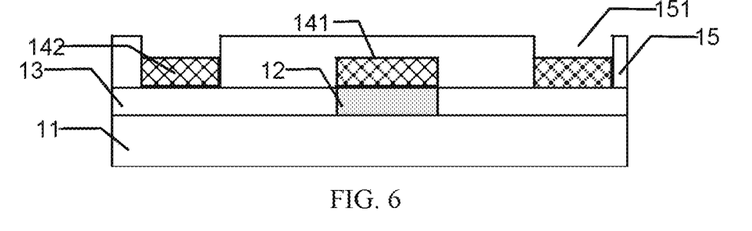
FIG. 6 is a cross-sectional diagram of the touch unit of FIG. 5, further illustrating a second insulating layer.

Thereafter, referring to FIG. 6, a second insulating layer 15 is formed and covers the first electrode 141, the second electrode 142, and the first insulating layer 13. The second insulating layer 15 has a via hole 151 exposing the second electrode 142.

Figure 7:
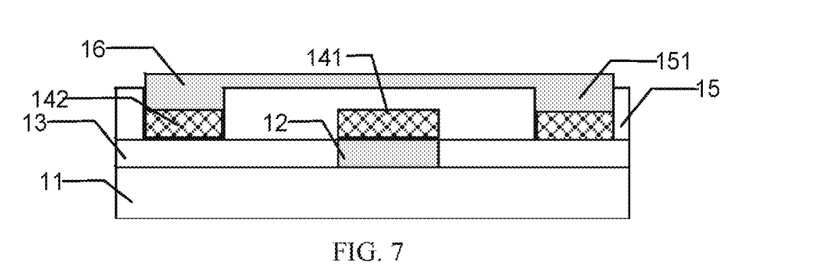
FIG. 7 is a cross-sectional diagram of the touch unit of FIG. 6, further illustrating a second connecting line.
Figure 8:
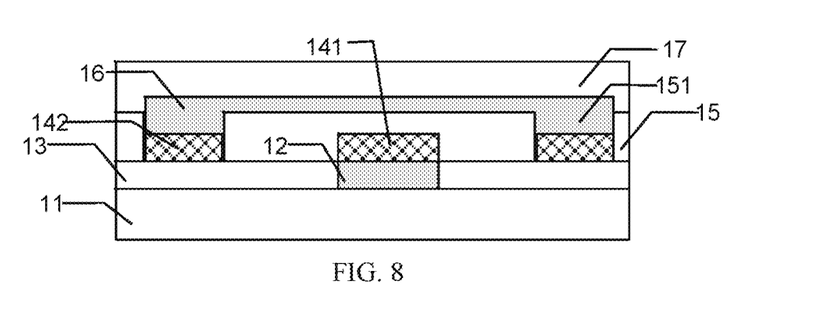
FIG. 8 is a schematic structural diagram of a touch unit according to an embodiment of the present disclosure.

Thereafter, referring to FIG. 7, a second connecting line 16 is formed, which is located on the second insulating layer 15, and is electrically connected to the second electrode 142 through the via hole.

Finally, referring to FIG. 8, a third insulating layer 17 is formed, which covers the second insulating layer 15 and the second connecting line 16.

In the present disclosure, the plurality of first connecting lines 12 of the plurality of touch units 310 in each of the rows are electrically connected in sequence in the second direction to form a plurality of rows of connecting lines, each of the plurality of rows of connecting lines is electrically connected to one of the first traces correspondingly. The plurality of second connecting lines 16 of the plurality of touch units 310 in each of the rows are electrically connected in sequence in the second direction to form a plurality of rows of connecting lines, and each of the plurality of rows of connecting lines is electrically connected to one of the second traces correspondingly.

In the present disclosure, the plurality of first traces are located in the first insulating layer 13 and electrically insulated from the first connecting line 12; and the plurality of second traces are located in the second insulating layer 15 and electrically insulated from the second connecting line 16.

By modifying structures of touch units 310, the present disclosure sets metal traces connecting the touch units 310 in a touch structure below a touch area. Compared with the prior art in which the metal traces are disposed outside the touch area, the present disclosure can prevent the metal traces of the touch area from occupying an area of a non-display area, thereby significantly reducing an area ratio of a non-display area to a display panel. Compared with the prior art, the present disclosure can effectively increase a screen-to-body ratio of the display panel.

Accordingly, the present disclosure also provides an electronic device including the display panel as described above.

While the invention has been described by way of example and in terms of the preferred embodiments, it is to be understood that the invention is not limited to the disclosed embodiments. To the contrary, it is intended to cover various modifications and similar arrangements. Therefore, the scope of the appended claims should be accorded the broadest interpretation so as to encompass all such modifications and similar arrangements.

What is claimed is:

1. A display panel, comprising a light emitting layer and a touch structure located above the light emitting layer, wherein
    the touch structure comprises a plurality of touch areas and a driving circuit, and each of the touch areas comprises a plurality of touch units;
    the plurality of touch units are arranged in a first direction in at least two rows, the plurality of touch units in each of the at least two rows are arranged in a second direction, the plurality of touch units are arranged in at least two columns along the second direction, and the plurality of touch units in each of the at least two columns are arranged along the first direction; and
    the driving circuit is located outside the touch areas, wherein
    a plurality of first traces are disposed below the touch areas, and the touch units in a same row are electrically connected to the driving circuit through same one of the plurality of first traces corresponding to the row;
    the touch units in a same column are electrically connected to the driving circuit through a same second trace corresponding to the column;
    wherein the touch units in each of the columns comprise a first end adjacent to the drive circuit and a second end distal from the drive circuit, and a plurality of second traces are led out from the first end; and
    wherein each of the touch units comprises:
    a first insulating layer having an opening;
    a first connecting line located in the opening of the first insulating layer;
    a first electrode located on the first connecting line, and is electrically connected to the first connecting line;
    a second electrode located on the first insulating layer, and is electrically insulated from the first electrode;
    a second insulating layer covering the first electrode, the second electrode, and the first insulating layer, wherein the second insulating layer has a via hole exposing the second electrode;
    a second connecting line located on the second insulating layer, and electrically connected to the second electrode through the via hole.

2. The display panel of claim 1, wherein the first direction and the second direction are perpendicular to each other, and the first traces are parallel to the first direction.

3. The display panel of claim 1, wherein a plurality of first connecting lines of the plurality of touch units in each of the rows are electrically connected in sequence in the second direction to form a plurality of rows of connecting lines, each of the plurality of rows of connecting lines is electrically connected to one of the first traces correspondingly.

4. The display panel of claim 3, wherein a plurality of second connecting lines of the plurality of touch units in each of the rows are electrically connected in sequence in the second direction to form a plurality of rows of connecting lines, and each of the plurality of rows of connecting lines is electrically connected to one of the second traces correspondingly.

5. The display panel of claim 4, wherein the plurality of first traces are located in the first insulating layer and are electrically insulated from the first connecting lines, and
    the plurality of second traces are located in the second insulating layer and are electrically insulated from the second connecting line.

6. The display panel of claim 1, wherein the first electrode in each of the touch units is in a strip shape, and a plurality of first electrodes of the plurality of touch units are disposed in parallel.

7. The display panel of claim 6, wherein the second electrode in each of the touch units is in a strip shape, a number of the second electrodes is two, and the two second electrodes are respectively located on opposite sides of the first electrode.

8. The display panel of claim 7, wherein the first electrode and the second electrode of each of the touch units are disposed in parallel, the first electrode and the second electrode have an equal length, and each of the second electrodes is spaced apart from the first electrodes by an equal distance.

9. An electronic device, comprising: a display panel, wherein the display panel comprises a light emitting layer and a touch structure located above the light emitting layer, wherein
    the touch structure comprises a plurality of touch areas and a driving circuit, and each of the touch areas comprise a plurality of touch units;
    the plurality of touch units are arranged in a first direction in at least two rows, the plurality of touch units in each of the at least two rows are arranged in a second direction, the plurality of touch units are arranged in at least two columns along the second direction, and the plurality of touch units in each of the at least two columns are arranged along the first direction; and
    the driving circuit is located outside the touch areas, wherein
    a plurality of first traces are disposed below the touch areas, and the touch units in a same row are electrically connected to the driving circuit through same one of the plurality of first traces corresponding to the row;
    the touch units in a same column are electrically connected to the driving circuit through a same second trace corresponding to the column wherein the touch units in each of the columns comprise a first end adjacent to the drive circuit and a second end distal from the drive circuit, and a plurality of second traces are led out from the first end; and wherein each of the touch units comprises:

a first insulating layer having an opening;

a first connecting line located in the opening of the first insulating layer;

a first electrode located on the first connecting line, and is electrically connected to the first connecting line;

a second electrode located on the first insulating layer, and is electrically insulated from the first electrode;

a second insulating layer covering the first electrode, the second electrode, and the first insulating layer, wherein the second insulating layer has a via hole exposing the second electrode;

a second connecting line located on the second insulating layer, and electrically connected to the second electrode through the via hole.

10. The electronic device of claim 9, wherein the first direction and the second direction are perpendicular to each other, and the first traces are parallel to the first direction.

11. The electronic device of claim 9, wherein a plurality of first connecting lines of the plurality of touch units in each of the rows are electrically connected in sequence in the second direction to form a plurality of rows of connecting lines, each of the plurality of rows of connecting lines is electrically connected to one of the first traces correspondingly.

12. The electronic device of claim 11, wherein a plurality of second connecting lines of the plurality of touch units in each of the rows are electrically connected in sequence in the second direction to form a plurality of rows of connecting lines, each of the plurality of rows of connecting lines is electrically connected to one of the second traces correspondingly.

13. The electronic device of claim 12, wherein the plurality of first traces are located in the first insulating layer and are electrically insulated from the first connecting lines, and the plurality of second traces are located in the second insulating layer and are electrically insulated from the second connecting line.

14. The electronic device of claim 9, wherein the first electrode in each of the touch units is in a strip shape, and a plurality of first electrodes of the plurality of touch units are disposed in parallel.

15. The electronic device of claim 14, wherein the second electrode in each of the touch units is in a strip shape, a number of the second electrodes is two, and the two second electrodes are respectively located on opposite sides of the first electrode.

16. The electronic device of claim 15, wherein the first electrode and the second electrode of each of the touch units are disposed in parallel, the first electrode and the second electrode have an equal length, and each of the second electrodes is spaced apart from the first electrodes by an equal distance.

* * * * *